(12) United States Patent
Lee et al.

(10) Patent No.: US 8,376,327 B2
(45) Date of Patent: Feb. 19, 2013

(54) VEHICLE SUSPENSION

(75) Inventors: Sangmok Lee, Seoul (KR); Kyoungsoo Park, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 562 days.

(21) Appl. No.: 12/544,056

(22) Filed: Aug. 19, 2009

(65) Prior Publication Data
US 2010/0044937 A1  Feb. 25, 2010

(30) Foreign Application Priority Data

Aug. 19, 2008  (KR) .................. 10-2008-0080765

(51) Int. Cl.
*F16F 5/00* (2006.01)
(52) U.S. Cl. ..................... 267/64.27; 267/113
(58) Field of Classification Search ............... 267/64.11, 267/64.23, 64.24, 64.21, 64.27, 118, 122, 267/113; 188/297, 298, 312, 322.11, 322.12
See application file for complete search history.

(56) References Cited

U.S. PATENT DOCUMENTS

| 6,003,848 | A  | * | 12/1999 | Cotter et al. | ............... | 267/64.11 |
| 6,926,264 | B1 | * | 8/2005  | Trowbridge    | ............... | 267/64.27 |
| 7,311,181 | B2 | * | 12/2007 | Germano et al.| ........       | 188/321.11|
| 2005/0179177 | A1 | * | 8/2005 | Thomae et al. | ............    | 267/64.27 |
| 2006/0055093 | A1 | * | 3/2006 | Cotter        | ..........      | 267/64.11 |
| 2006/0071378 | A1 | * | 4/2006 | Brown         | ..........      | 267/122   |
| 2010/0237549 | A1 | * | 9/2010 | Jeischik      | ..........      | 267/122   |

FOREIGN PATENT DOCUMENTS

| DE | 102006036248 A1 | * | 2/2008 |
| JP | 2003-287082 A   |   | 10/2003 |
| JP | 2006-207771 A   |   | 8/2006 |
| JP | 2007-046699 A   |   | 2/2007 |
| KR | 10-2006-0056562 A |  | 5/2006 |

* cited by examiner

*Primary Examiner* — Robert A Siconolfi
*Assistant Examiner* — Anna Momper
(74) *Attorney, Agent, or Firm* — Knobbe Martens Olson & Bear, LLP

(57) ABSTRACT

A strut assembly forming an upper part of a cylinder joined to a wheel is joined to a vehicle body via an insulator and joining member, an airtight chamber space is formed by a strut cover joined to a spring body joined to a damper rod drawn from the cylinder, whereby a CDC type damper with the chamber space of which air pressure is controlled in order to vary the movement characteristic depending on movement of a tire and a damper joined to an inner space of the spring body has an urethane made damper guider having dug air channels where air moves even in a state where the damper is in close contact with the damper rod.

6 Claims, 5 Drawing Sheets

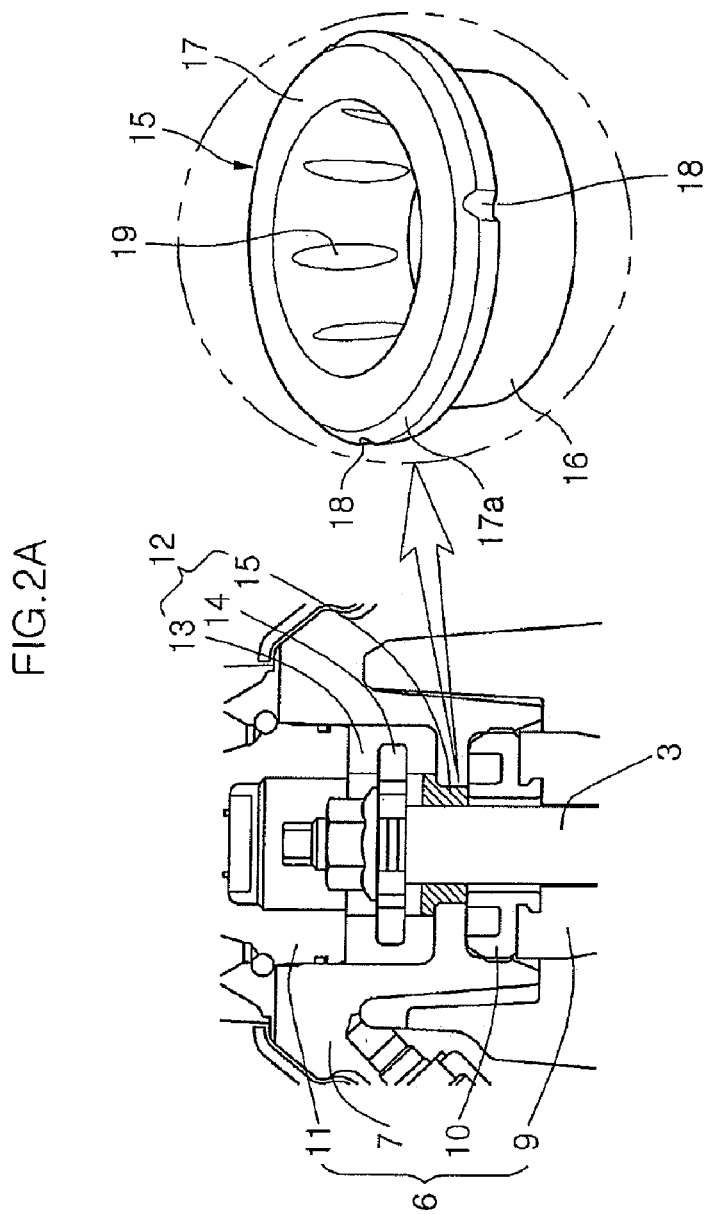

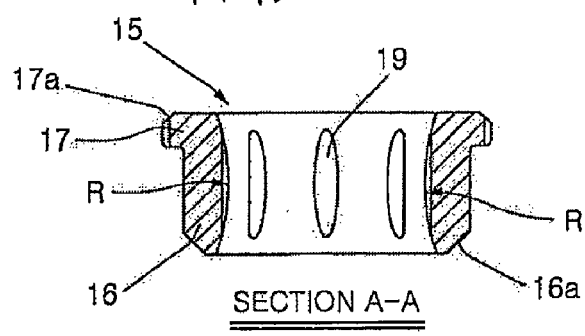
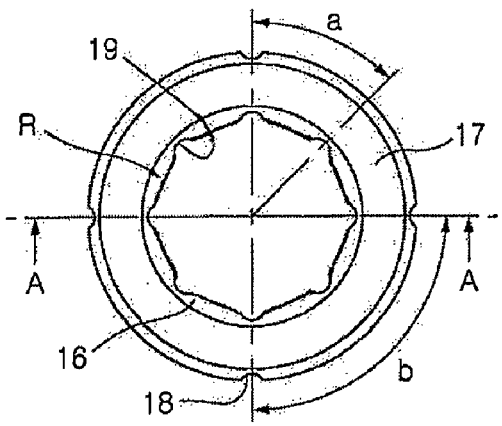

SECTION C-C

VEHICLE SUSPENSION

CROSS-REFERENCE TO RELATED APPLICATIONS

The present application claims priority from, Korean Application Serial Number 10-2008-0080765, filed on Aug. 19, 2008, the disclosure of which is hereby incorporated by reference herein in its entirety.

FIELD

The present disclosure relates to an air suspension in a vehicle, and more particularly, to an air spring assembly that improves durability of a damper mount.

BACKGROUND

Generally, a suspension in a vehicle is capable of preventing a damage of a vehicle body and improving passenger's rid comfort by properly reducing vibration or a shock which a vehicle axle gets from a road surface in traveling by connecting the vehicle axle and the vehicle body to each other.

That is, such a suspension performs an operation of restricting rolling of the vehicle body as well as an operation of responding to alignment and lateral force and brake and driving force generated by a wheel while disabling the vehicle body to be influenced by roughness of the road surface and allowing the vehicle body to travel the rough road surface by providing the vehicle with vertical flexibility.

The suspension performs the operation of restricting the rolling of the vehicle body in order to improve straight braking stability and turning stability by easily inducing an understeer in the tendency of a sudden oversteer (generally occurring at turning) by a tow angle varying depending on a traveling state so as to satisfy a basic condition that front and rear opposite wheels should secure operability and stability in driving the vehicle, thereby maintaining the rid comfort and operation stability of the vehicle in an optimum state.

An air suspension adopting an air spring among such suspensions allows the height of the vehicle to be adjusted according to an operation condition of the vehicle and implements rid comfort better than a coil spring by a characteristic of the air spring.

The air spring adopted for the air suspension generally includes a damper. The damper reduces vibration or a shock applied from the outside by disabling the vibration or shock transmitted from the road surface to the vehicle axle in traveling by connecting the vehicle axle and the vehicle body to each other.

In addition, the damper adopted for the air spring generally adopts a CDC (Continuous Damping Control) damper in order to implement further improved damping performance. Such a CDC damper can secure the stability of the vehicle in turning, braking, and driving by varying a movement characteristic of the damper in real time, that is, maintaining a vertical load on a tire grounding surface in traveling the rough road surface at a proper level, and can provide a passenger with ease ride comfort and driving convenience by effectively isolating irregular pressure of the road surface generated in driving the vehicle.

The foregoing discussion is to provide general background information, and does not constitute an admission of prior art.

SUMMARY

An aspect of the present invention is to satisfy both intensification of durability and reduction of rattle noise opposite to each other by allowing a soft characteristic in which rattle noise generated due to variation in internal pressure of a CDC (Continuous Damping Control) damper to be implemented as the CDC damper adopted for a strut forming a vehicle body-side joining portion of an air spring prevents an internal gap from being formed by using an elastic material and allowing the durability to be intensified as strong as a hard characteristic of the CDC damper horizontal-direction movement of a damper (damper assembly) load through lateral force generated by applied external force is restricted by blocking the internal gap of the damper.

Another aspect of the present invention is to achieve intensification of durability and reduction of rattle noise without a change in design by restricting horizontal-direction movement of a damper or piston rod joined to a CDC damper and preventing vibration generated by variation in internal pressure of the damper from being transmitted via an air spring by shielding an internal space of the CDC damper adopted or a strut of the air spring.

An air spring assembly of an air suspension according to an embodiment of the present invention includes a cylinder assembly, a strut assembly, a joining member, and an insulator. The cylinder assembly includes a cylinder absorbing and damping external force generated by a bump and a rebound of the wheel. The wheel is connected to a pair of lower and upper arms joined to a vehicle body, which supports a load generated by external force, and a stabilizer bar controlling rolling due to turning of a vehicle. The strut assembly forms a CDC (Continuous Damping Control) type damper varying an air pressure characteristic by a control of a controller controlling driving of the vehicle, is airtightly sealed by a strut cover to have a chamber space which air pressure is inputted into and discharged from through a spring body joined to a damper or piston rod drawn from the cylinder. The strut assembly includes a damper joined to an inner space formed the spring body so that the damper guider or damper guide with outer and inner air channels forming internal air flow when a pressure difference occurs is in close contact with the damper rod while covering the damper rod. The joining member allows the strut assembly to be mounted on the vehicle body. The insulator absorbs and damps vibration transmitted to the vehicle body while covered by an upper part of the spring body and the joining member.

The cylinder assembly includes a cylinder joined to a knuckle portion of the wheel to absorb a shock by the bump and rebound of the wheel, and a cylinder cover joined to a top cup covering a part of the cylinder where the damper rod protrudes so that the chamber space formed through a strut cover covering the strut assembly is sealed through the strut cover.

The strut assembly includes a spring body, a bump, a top cap, and a damper. In the spring body, the strut cover covering the cylinder joined to the wheel is joined to an outer peripheral surface of the spring body so as to form the sealed chamber space which air pressure is inputted into and discharged from. The insulator joined to the vehicle body is coupled to the spring body. In the spring body, the damper rod drawn from the cylinder penetrates an inner space of the spring body. The bump covers the damper rod penetrating the chamber space with an insert in a lower part of the spring body. The top cap is coupled to a space formed in an upper part of the spring body and is coupled with the joining member joined to the vehicle. The damper guider includes outer and inner air channels forming internal air flow while being in close contact with the damper rod penetrating the spring body.

The damper includes a damper mount pressed through the top cap positioned in the upper part of the inner space of the spring body; a damper washer (or washer damper) fitted in an inner groove of the damper mount and positioned below a nut joined to the damper rod; and a damper guider inserted into the spring body which the damper rod penetrates to be joined to the damper mount while covering the damper rod.

The damper guider is constituted by a guider body being in close contact with the damper rod and fitted in the spring body, an extension flange extended in a concentric circle shape and fitted in the damper mount is formed in the guider body, whereby the damper guider restricts the movement of the damper rod applied with the external force in a state where the damper guider is in close contact with the spring body and the damper mount while covering the damper rod, and inner and outer channels forming air flow are provided with the guide body.

A hollow inner surface of the guider body has a radius to project to the inner space.

The inner air channel is vertically dug on an inner surface of the guider body and the outer air channel is formed by digging a peripheral portion of the extension flange fitted in the damper mount.

According to the embodiment of the present invention, it is possible to achieve a soft rigidity characteristic of reducing rattle noise and to intensify durability performance of a strut through restriction of movement of a damper rod occurring by lateral force applied from the outside by blocking a gap in a CDC damper adopted for a strut of an air spring, whereby it is possible to satisfy intensification of durability and reduction of rattle noise which are design factors opposite to each other without a change in design of the strut of the air spring.

BRIEF DESCRIPTION OF THE ACCOMPANYING DRAWINGS

For a better understanding of the nature and features of the present invention, reference should be made to the following detailed description with the accompanying drawings, in which:

FIG. 2A illustrates a damper assembly and a damper guide according to an embodiment of the present invention;

FIG. 2B illustrates a cross section and a top view of the damper guide of FIG. 2A;

DETAILED DESCRIPTION OF EMBODIMENTS

Hereinafter, embodiments of the present invention will be described in detail with reference to the accompanying drawings. Embodiment are just examples and may be implemented in various forms by those skilled in the art. Therefore, the scope of the subject matter is not limitative to the embodiments disclosed herein.

Various loads act on a strut part joined to the vehicle body being provided with the CDC damper, which is a part opposite to the air spring mounted on the wheel, that is, the vertical load generated by the damper's own damping operation and lateral force generated by twisting of a bush within a strut act on the strut part. Further, in a strut structure mounted with a stabilizer bar, the lateral force is generated in the damper according to vertical movement. Due to such a load operation, rigidity cannot help being intensified in order to secure sufficient durability performance of the damper. The rigidity intensification causes various vulnerabilities.

For example, in case of intensifying the rigidity of the damper, particularly, the CDC damper, rattle noise increases, that is, noise transmitted to the vehicle while vibration generated due to pressure variation in the CDC damper passes through an insulator further increases, thereby causing a difficulty in design in which only the intensification of the durability of the damper cannot be desirable in developing the CDC damper.

In order to solve such a design vulnerability and prevent the rattle noise, the characteristic of the CDC damper may be softened, but the variation in the characteristic of the CDC damper causes lowering of the durability of the strut part, which is a fundamental vulnerability, thereby being vulnerable to concentration of the vertical load, particularly, durability is further weakened, resulting in damaging elements.

Accordingly, in a case when the air spring is used and the CDC damper is adopted, there is keenly required the development of an air spring adopting a strut capable of satisfying opposite dual conditions such as the intensification of the durability of the strut part with the CDC damper and the lowering of the rattle noise.

Figure 1:
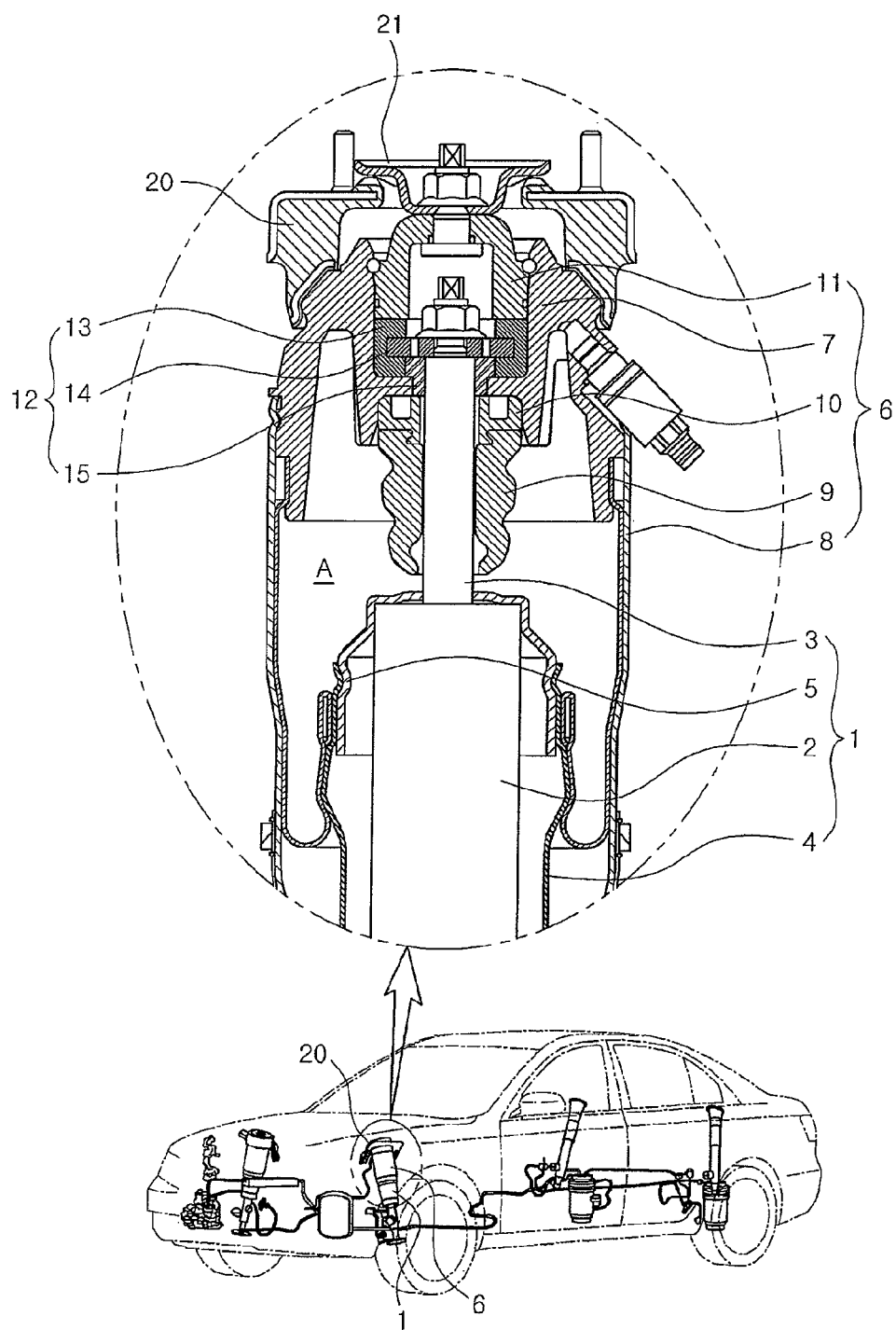
FIG. 1 is a diagram illustrating a state in which an air suspension adopting an air spring assembly preventing the durability of a damper mount from being lowered due to lateral force on a vehicle according to an embodiment of the present invention.

FIG. 1 is a diagram of the configuration of an air suspension adopting a lateral force decreasing type air spring assembly according to an embodiment of the present invention. An air spring assembly according to the embodiment of the present invention includes a cylinder assembly 1 joined to a wheel, which absorbs and damps external force and a strut assembly 6 joined to a vehicle body which constitutes a CDC (Continuous Damping Control) type damper varying a movement characteristic in real time while absorbing and damping a vertical load and the lateral force generated by the external force.

A joining member 21 mounting a strut portion to the vehicle body and an insulator 20 absorbing vibration transmitted to the vehicle body while surrounding the strut portion and joining member 21 are provided in a part of the vehicle body, which is joined to strut assembly 6.

The CDC type damper constituting strut assembly 6 forms an air pressure control circuit controlling air pressure in a chamber space within the strut in order to secure the stability of a vehicle in turning, braking, and driving by maintaining a vertical load on a tire grounding surface in traveling an irregular road surface at a proper level and provide a passenger with ease ride comfort and driving convenience by effectively isolating irregular pressure of the road surface. The CDC type damper is generally constituted by an ECU or a suspension controller, a compressor, an air pressure line, and various control valves, etc.

Such an air spring assembly is applied to four wheels to constitute a suspension in the vehicle. The air spring assembly secures the stability of the vehicle, and provides easier ride comfort and driving convenience by adjusting the height of the vehicle and by varying a movement characteristic of a damper 12 in real time through controlling air pressure in the strut forming an upper portion of an air spring.

Cylinder assembly 1 includes a cylinder 2 absorbing a shock according to a bump rebound of the wheel, an upper cylinder cup 5 covering a damper rod or piston rod 3 drawn from the cylinder, and a cylinder cover 4 covering cylinder 2.

An upper portion of cylinder assembly 1, that is, strut assembly 6 joined with damper rod 3 drawn from cylinder 2 forms a chamber space of which air pressure is controlled according to movement of the wheel. Chamber space A is formed by a strut cover 8 covering cylinder assembly 1 while forming strut assembly 6.

The strut assembly 6 has strut cover 8 forming chamber space A by covering cylinder 2, a spring body 7 which is an elastic body covering damper rod 3, inside thereof, and a damper 12 joined to an inner space formed in spring body 7 and being in close contact with damper rod 3 in order to configure the CDC type damper varying the movement characteristic according to the movement of the wheel in real time by forming chamber space A joined to damper rod 3 drawn from cylinder 2, which the air pressure is inputted into and discharged from to form chamber space A covering cylinder 2.

Further, an elastic bumper 9 reducing the lateral force while damping movement of damper rod 3 by covering damper rod 3 is further provided in a lower chamber space A of spring body 7. Bumper 9 is joined to chamber space A via an insert 10 being in close contact with a lower part of spring body 7.

Spring body 7 and bumper 9 are generally made of a rubber material or a urethane foam material.

A top cap 11 forming a space by pushing a part of damper 12 joined to spring body 7 is further joined to an upper part of spring body 7. Top cap 11 is made of an aluminum material.

Such a damper (or damper assembly) 12 is configured to have strong durability to the lateral force acting together with the vertical load generated through the external force. Damper 12 includes a damper mount 13 pressed through top cap 11 in the upper part of the inner space of spring body 7, a damper washer (or washer damper) 14 fitted in an inner groove of damper mount 13 and positioned below a nut joined to damper rod 3, and a damper guider (or damper guide) 15 inserted into spring body 7 which damper rod 3 penetrates to be joined to damper mount 13 while covering damper rod 3.

Damper mount 13 and damper guider 15 are made of a vulcolab solid material which is the urethane material.

As shown in FIGS. 2A and 2B, damper guider 15 is constituted by a guider body 16 being in close contact with damper rod 3 penetrating an inner diameter and fitted in spring body 7 and an extension flange 17 extended in a concentric circle shape and fitted in damper mount 13 is formed in guider body 16, whereby damper guider 15 restricts the movement of damper rod 3 applied with the external force in a state where damper guider 15 is in close contact with spring body 7 and damper mount 13 while covering damper rod 3.

Inclined surfaces 16a and 17a are formed by inclining side portions of guider body 16 constituting damper guider 15 and extension flange 17, thereby facilitating joining in assembly to enable an easier assembling operation.

Further, an inner surface of damper guider 15, that is, an inner surface where damper rod 3 penetrates guider body 16 and extension flange 17 has a radius R and has a shape projecting to an inner space, thereby generating strong adhesive force while covering damper rod 3 and remarkably reducing occurrence of abrasion according to the movement of damper rod 3 by the applied external force.

An air channel is formed in each of guider body 16 and extension flange 17 for a cooling operation through air circulation even in the assembly state. For example, an inner air channel 19 vertically dug is formed on the inner surface of guider body 16 being in close contact with damper rod 3 and an outer air channel 18 formed by digging the periphery of extension flange 17 fitted in damper mount 13 is formed in extension flange 17.

An inner air channel 19 has an ellipse structure formed only by an inner portion projecting in a radius R.

The outer air channel 18 is formed in plural at regular intervals. Outer air channel 18 is preferably formed at 90° b.

The inner air channel 19 is formed in plural at regular intervals. Inner air channel 19 is preferably formed at 45° at regular intervals.

In the air spring assembly according to the embodiment of the present invention, strut assembly 6 forming the upper part of cylinder 2 joined to wheel W is joined to the vehicle body via insulator 20 and joining member 21, airtight chamber space A is formed by the strut cover joined to spring body 7 joined to damper rod 3 drawn from cylinder 2, whereby the CDC type damper with chamber space A of which air pressure is controlled in order to vary the movement characteristic depending on movement of a tire and damper 12 joined to the inner space of spring body 7 has the urethane made damper guider 15 having dug air channels 18 and 19 where air moves even in a state where damper 12 is in close contact with damper rod 3.

By a structural characteristic of the air spring assembly, the air suspension adopting the air spring assembly intensifies durability by restricting the movement of damper rod 4 occurring by the irregular pressure of the road surface and the lateral force caused through suspension elements and implements a characteristic of the CDC damper in a soft type for decreasing the rattle noise, thereby satisfying improvement of performance improvements such as the intensification of the durability and the reduction of the rattle noise which are design factors opposite to each other at once.

As shown in FIGS. 2A and 2B, in the air spring assembly according to the embodiment of the present invention, strut assembly 6 is joined to an end of damper rod 3 drawn from cylinder 2 constituting cylinder assembly 1 joined to wheel W performing a bump rebounding operation, and in strut assembly 6 are provided spring body 7 forming chamber space A where the air pressure varies by sealing cylinder 2 and damper 12 restricting the movement due to the external force by being in close contact with damper rod 3.

In such a damper 12, the urethane made damper mount 13 is positioned in a space of spring body 7 having chamber space A formed in the lower part thereof, urethane made damper guider 15 being in close contact with damper rod 3 is fitted in spring body 7 which damper rod 3 penetrates in a state that damper guider 15 is positioned below damper mount 13, and damper washer 14 is fitted in the inner groove of damper mount 13 and is positioned below a nut joined to damper rod 3.

As illustrated, the damper guider 15 has a generally ring-shaped structure. The interior or inner surface of the ring-shaped damper guider 15 is generally convex or bulged to the central or middle portion thereof along the direction of the damper rod's movement. Thus, the radius of the opening in the ring-shaped damper guider 15 is smaller in the central or middle portion than at the edge portions in the direction of the damper rod's movement.

Figure 2C:
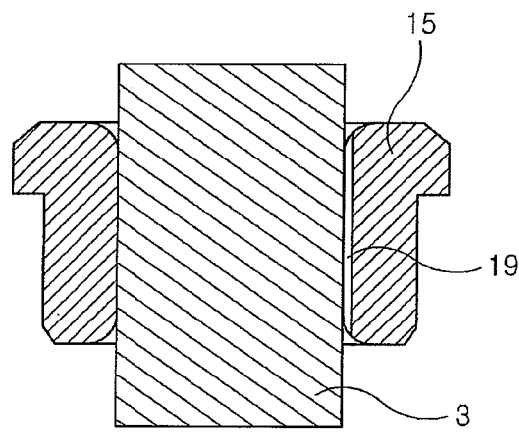
FIG. 2C illustrates a cross section and a top view of the damper guide and a piston rod as engaged in the damper guide in accordance with an embodiment of the present invention.
Figure 2C:
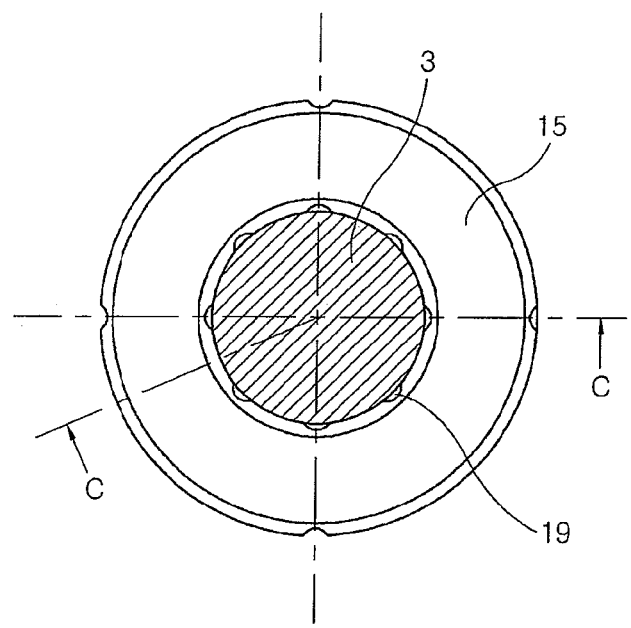

FIG. 2C illustrates an embodiment in which the damper rod 3 is engaged with and surrounded by the damper guider 15. When the damper rod 3 is engaged with the damper guider 15, the bulged central portion of the interior surface of the damper guider 15 is slightly compressed outwardly by the damper rod 3. As illustrated in the cross-sectional view, the damper rod 3 contacts generally the central portion of the inner surface of the damper guider 15. With the contact between the central portion of the damper guider 15 and the damper rod 15, lateral movement of the damper rod 15 can be avoided or at least reduced.

On the other hand, the upper and lower edge portions interposing the central portion do not contact the damper rod 3. With this configuration only the central portion of the damper guider 15 contacts the damper rod 15, and thus friction between the damper rod 3 and the interior surface of the damper guider 15 can be minimized.

Further, as illustrated in FIG. 2B, the inner surface of the damper guider 15 includes at least one concave or recess portion 19 formed into the convex or bulged portion of the inner surface. The recess portion 19 provide an inner air channel 19 defined between the damper rod 3 and the interior surface of the damper guider 15 once the damper rod 3 is engaged with the damper guider 15. In one embodiment of damper guider 15, several or more than several recess portions 19 are formed into the convex or bulged portion of the inner surface of the damper guider 15. The inner air channel 19 formed between the damper rod 3 and the damper guider 15 allows air flow between internal spaces or chambers located upper and lower than the damper assembly 12, and therefore can provide cooling effect in the system.

Outer air channel 18 of which peripheral portion is dug is formed is formed at a portion fitted in damper mount 13 in plural, whereby it is possible to implement the cooling operation through the air circulation even in the assembly state.

Figure 3:
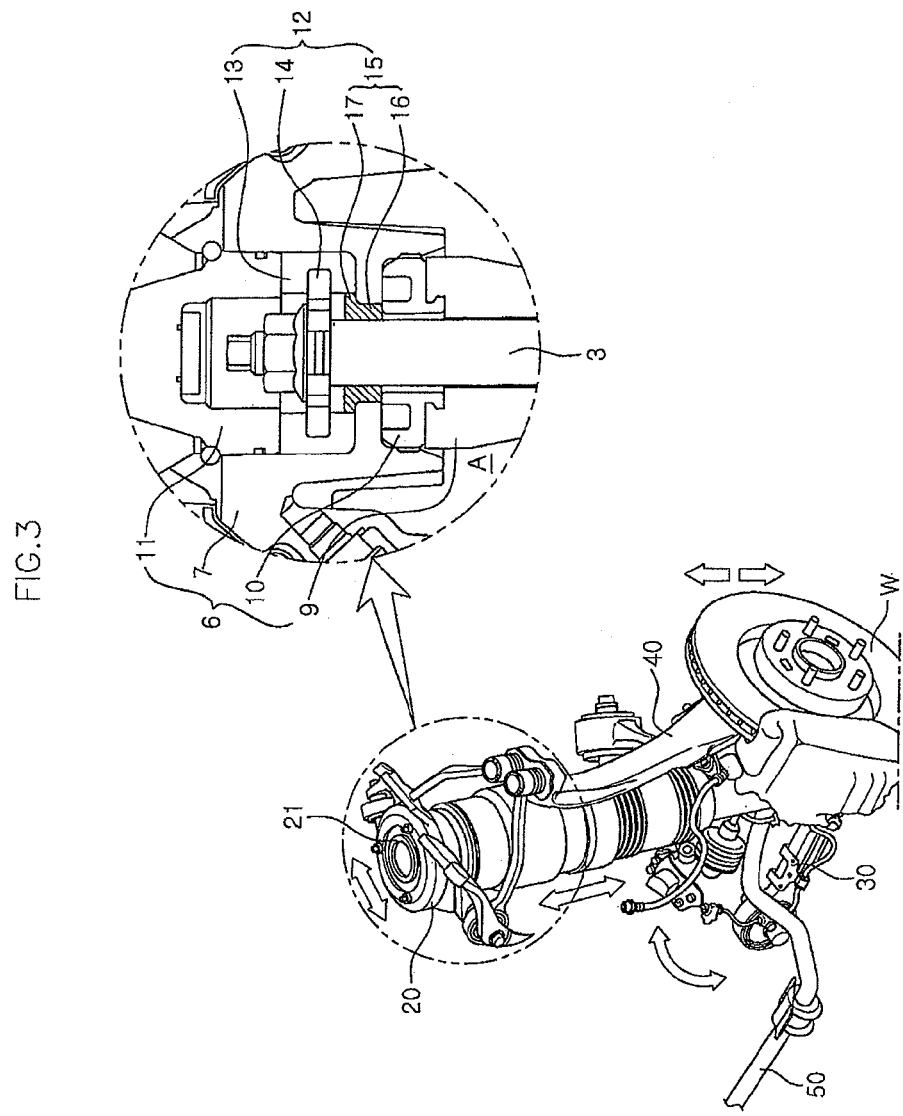
FIG. 3 is a diagram illustrating an external force operation of an air suspension adopting an air spring assembly according to an embodiment of the present invention.

As shown in FIG. 3, the air suspension adopting the air spring assembly having such a structural characteristic has a general configuration, that is the air spring assembly is joined to wheel W and the vehicle body, and a pair of lower and upper arms 30 and 40 are vertically joined to the vehicle body and wheel W at a predetermined interval to support the load for the external force, and stabilizer bar 50 is joined to both wheels to control the rolling in turning the vehicle.

Accordingly, in driving the vehicle, a movement characteristic of stabilizer bar 50, which is applied to vibration transmission depending on variation of the air pressure at strut assembly 6 by controlling the CDC type damper and the vertical external force operation by the bump and the rebound of wheel W movement, that is, both the vertical movement serving as main vibration and the lateral force which is secondary external force by twisting movement occurring at a bush joining point act on the air suspension.

Various loads acting on the air suspension and concentrated mainly to the air spring assembly are absorbed and alleviated through the operation of strut assembly 6. Strut assembly 6 may be implemented through damper 12 joined to spring body 7 constituting the CDC type damper by forming chamber space A in which the air pressure varies.

The damper 12 includes damper mount 13 pressed by top cap 11 in the upper part of spring body 7 and urethane made damper guider 15 drawn from cylinder 2 joined to wheel W, which restricts damper rod 3 penetrating spring body 7, whereby it is possible to implement the characteristic of the damper in the soft type and isolate a vibration propagation environment occurring due to the movement of damper rod 3 and the variation in air pressure within chamber space A.

That is, in a case that the lateral force acts on strut assembly 6 by the movement characteristic of stabilizer bar 50, damper guider 15 is in close contact with the outer peripheral surface of damper rod 3 while covering the outer peripheral surface of damper rod 3 in a state where damper guider 15 is fitted between spring body 7 and damper rod 3 penetrating spring body 7, whereby it is possible to suppress the vibration of damper rod 3 by restricting damper rod 3 with damper guider 15 even though the lateral force acts on damper rod 3 to move damper rod 3.

The restriction of damper rod 3 with damper guider 15 is more strongly operated through the structural aspect of damper guider 15. Accordingly, as shown in FIGS. 2A and 2B, since the inner surface of damper guider 15, which projects in radius R is deformed to be in closer contact with damper rod 3 when damper guider 15 covers damper rod 3 damper guider 15, it is possible to more strongly restrict the vibration of damper rod 3 due to the lateral force.

The restriction of damper rod 3 by the close adherence between damper guider 15 and damper rod 3 prevents damper rod 3 from moving and remarkably reduces the abrasion of damper guider 15 being in close contact with damper rod 3, thereby allowing the CDC type damper in strut assembly 6 to have the soft characteristic and intensifying the durability of the CDC type damper.

In addition, the air spring assembly remarkably decreases or isolates the rattle noise generated in strut assembly 6 due to the variation in air pressure within chamber space A. As damper rod 3 is covered by damper guider 15 and damper guider 15 is joined to spring body 7 forming chamber space A in strut assembly 6, the sudden variation in air pressure in chamber space A in controlling the air pressure, thereby alleviating the vibration transmitted to spring body 7.

A space for amplifying the vibration transmitted to spring body 7 forming chamber space A, that is, a space for damper rod 3 penetrating and joined to spring body 7 is not formed by damper guider 15. By the nonformation of the space, damper guider 15 serves to damp and absorb the vibration to disable the vibration to be transmitted to adjacent portions even though spring body 7 vibrates. Therefore, a vibration level of spring body 7 generated by the variation in air pressure within chamber space A deteriorates, thereby remarkably decreasing the rattle noise.

The air spring assembly performs a cooling operation of suppressing an increase in temperature within strut assembly 6 occurring due to the continuous bump and rebound of wheel W. The cooling operation is also implemented by formation of air flow through damper guider 15 joined while covering damper rod 3 penetrating spring body 7.

Even in a state when damper guider 15 covers damper rod 3, outer and inner air channels 18 and 19 formed in damper guider 15 are not blocked, that is, inner air channel 19 forms an air passage extending in a shaft direction of damper rod 3 even in a state when damper guider 15 is in close contact with damper rod 3 by the inner surface of guider body 16 forming damper guider 15, which projects in radius R and outer air channel 18 forms the space for spring body 7 even in a state when extension flange 17 forming damper guider 15 is in close contact with spring body 7.

As a result, if the pressure in chamber space A is higher than that in the upper part of spring body 7, the pressure acting on the upper part of spring body 7 forms a flow discharged through outer and inner air channels 18 and 19 of damper guider 15, while if the pressure in chamber space A is lower than that in the upper part of spring body 7, the pressure acting on the lower part of spring body 7 forms a flow discharged through outer and inner air channels 18 and 19.

As described above, the air flow formed in the upper and lower parts of spring body 7 through outer and inner air channels 18 and 19 of damper guider 15 naturally decreases the internal temperature of strut assembly 7 and suppress sudden variation of the air pressure in controlling the pressure of chamber space A, that is, a rapid increase or decrease in pressure of chamber space A.

What is claimed is:

1. A vehicle suspension, comprising:

a cylinder assembly including a cylinder joined to a wheel for absorbing and damping external force generated by a bump and a rebound of the wheel;

a strut assembly airtightly sealed by a strut cover defining a chamber which air is inputted into and discharged from through a spring body joined to a damper rod drawn from the cylinder, and the strut assembly including a damper guider configured to guide the damper rod, wherein the damper guider is configured to form at least one inner air channel defined between the damper rod and an interior surface of the damper guider;

a joining member allowing the strut assembly to be mounted on the vehicle body; and an insulator absorbing and damping vibration transmitted to the vehicle body while covering an upper part of the spring body and the joining member, wherein the strut assembly includes:

the spring body in which the strut cover covering the cylinder joined to the wheel is joined to an outer peripheral surface of the spring body, to which the insulator joined to the vehicle body is coupled and in which the damper rod drawn from the cylinder penetrates an inner space of the spring body so as to form the sealed chamber space which air pressure is inputted into and discharged from;

a bumper surrounding the damper rod penetrating the chamber space with an insert in a lower part of the spring body;

a top cap coupled to a space formed in an upper part of the spring body and coupled with the joining member joined to the vehicle; and the damper guider having the at least an inner air channel forming internal air flow while being in close contact with the damper rod penetrating the spring body, wherein the vehicle suspension comprises a damper which includes:

a damper mount pressed through the top cap positioned in the upper part of the inner space of the spring body;

a damper washer fitted in an inner groove of the damper mount and positioned below a nut joined to the damper rod; and the damper guider inserted into the spring body which the damper rod penetrates to be joined to the damper mount while surrounding the damper rod, wherein the damper guider comprises a guider body being in close contact with the damper rod and fitted in the spring body, and an extension flange extended in a concentric circle shape from the guider body and fitted in the damper mount, whereby the damper guider restricts the movement of the damper rod applied with the external force in a state where the damper guider is in close contact with the spring body and the damper mount while covering the damper rod, and wherein the damper guider includes at least one outer air channel forming air flow, wherein a hollow inner surface of the guider body has a convex portion, wherein the convex portion contacts the damper rod and is bulged inwardly in a cross-section taken on a plane parallel to a sliding direction of the damper rod.

2. The suspension as defined in claim 1, wherein the cylinder assembly includes the cylinder joined to a knuckle portion of the wheel to absorb a shock by the bump and rebound, and a cylinder cover joined to a top cup covering a part of the cylinder where the damper rod protrudes so that the chamber space is sealed.

3. The suspension as defined in claim 1, wherein the damper mount and the damper guider are made of an urethane material.

4. The suspension as defined in claim 1, wherein the at least one inner air channel is formed on an inner surface of the guider body, wherein the damper guider includes the at least an outer air channel formed on the extension flange fitted in the damper mount.

5. The suspension as defined in claim 1, wherein the at least one inner air channel comprises two or more inner air channels and the at least one outer air channel comprises two or more outer air channels, wherein the number of the inner air channels is greater than that of the outer air channels.

6. The suspension as defined in claim 5, the inner air channels are formed at regular intervals.

* * * * *